Oct. 1, 1946.  C. A. DONALDSON  2,408,415
DISTANCE GAUGING AND LIKE APPARATUS
Filed Feb. 11, 1942    5 Sheets-Sheet 1

Inventor
CHARLES A. DONALDSON,
his Attorney

Oct. 1, 1946.   C. A. DONALDSON   2,408,415
DISTANCE GAUGING AND LIKE APPARATUS
Filed Feb. 11, 1942   5 Sheets-Sheet 3

Inventor
CHARLES A. DONALDSON,
By Ben. J. Lehrony
his Attorney

Oct. 1, 1946.    C. A. DONALDSON    2,408,415
DISTANCE GAUGING AND LIKE APPARATUS
Filed Feb. 11, 1942    5 Sheets-Sheet 4

Inventor
CHARLES A. DONALDSON,

Patented Oct. 1, 1946

2,408,415

UNITED STATES PATENT OFFICE 2,408,415

DISTANCE GAUGING AND LIKE APPARATUS

Charles A. Donaldson, Del Rio, Tex.

Application February 11, 1942, Serial No. 430,464

14 Claims. (Cl. 250—1.66)

This invention relates to a means for measuring and registering distances from the surface of a mass with particular reference to "blind flying" or the navigation of an airplane in a low visibility atmosphere for the purpose of ascertaining distances, vertical or horizontal, and attaining that result by means of a combination of oscillators and detectors using high-frequency radio waves together with a grid controlled cathode-ray tube or tubes as hereinafter described. This is a continuation-in-part of my copending application Serial No. 279,949, filed June 19, 1939, now Patent No. 2,408,414, issued October 1, 1946.

I am aware of the work which has been done by R. W. Hart (U. S. Patent No. 1,924,156), E. Wolf (U. S. Patent 1,924,174) and J. Lyman et al. (U. S. Patent No. 2,227,598) on absolute altimeters in which short pulses of radio waves are used to measure distances. In these instruments a low-frequency wave or a mechanical contactor is used to overcome the bias on a high-frequency oscillator or amplifier in order to send out a pulse of high-frequency waves. In the timing wave systems it is necessary to have the negative bias set very close to the peak value of the timing wave in order to obtain a short pulse. Thus the timing wave is very close to the zero slope point when the pulse is started and it is very hard to hold the pulse to an exact point on the timing cycle. It will be even harder to hold a mechanical contactor to a fixed point at the speeds necessary in order to use radio waves for measuring distances. It must be realized that a variation of $\frac{1}{10}$ microsecond in the timing of the pulses will give an error of approximately 50 feet in the instrument reading.

In this present instrument here disclosed I use the steepest part of the timing wave in the case of a sine wave, or any steep front wave, such as a square wave, to start the oscillations. The passage of the oscillator grid current through a high resistance shunted by a very small capacity develops a high negative bias and blocks the oscillation in a small fraction of a microsecond in the well known manner of the blocking oscillator producing a short wave train, or self-quenching oscillator.

An object of my invention is to provide a sending and a receiving means whereby an intermittent or a modulated high-frequency wave is radiated from the sending oscillator to the surface of the earth or other reflecting mass and reflected to the receiver, and the time between the sending and the receiving of the wave is shown as a definite space or distance on a scale which space is calibrated to show by direct reading the true distance from the reflecting mass.

In one modification of this instrument I use a cathode-ray tube or tubes as the indicator, using the return pulses to develop a bright pointer from which the distance may be read on a scale around the circumference of the screen. In another modification I use the return pulses to control an auxiliary oscillator and compare the phase of the wave from the controlled oscillator with the phase of the wave from the timing oscillator on some type of phase meter calibrated in feet or other linear distance.

Radio waves are propagated with a speed of approximately 186,000 miles per second or 972,000,000 feet per second. Since in this apparatus the wave must travel to the reflecting mass and return, the speed for the reading is one-half or 486,000,000 feet per second and a 1,000 feet reading will take $\frac{1}{486,000}$ second. Therefore, if the electron beam in a cathode-ray tube is deflected by a sweep frequency of 486 kilocycles, a complete cycle of the electron beam will take place in the time necessary for the radio wave to travel 1,000 feet and return, and the full trace will give a reading of 1,000 feet. By using a sweep frequency of 4860 kilocycles the trace will give a reading of 100 feet and by using a sweep of 48.6 kilocycles the trace will give a reading of 10,000 feet.

In one form of this instrument I use a cathode-ray tube with both sets of deflection plates driven by the same timing frequency, but with the phase on one set displaced 90 degrees from that on the other set, so that the electron beam describes a circle. I refer to these two voltages as the quarter-phase voltage. By varying this quarter-phase voltage from zero to maximum, the electron beam is caused to trace a spiral from the center to the circumference of the screen.

In this instrument I use a high negative bias on the grid of the cathode-ray tube so that the electron beam trace becomes invisible. Then the signal is applied to the grid as a positive pulse, overcoming the negative bias and causing a bright spot to appear on the trace for the duration of the signal. Since the signal comes at the same point for each revolution of the electron beam, it will trace a radial line from the center to the circumference of the screen. By using a sharp pulse such as that obtained by detecting the transmitter pulse or by using the detector output to control an auxiliary blocking oscillator, this line may be made very narrow and used as a pointer, from which the distance of the reflecting mass may be read on a calibrated scale around the screen.

In another modification of this instrument I use the pulse from the detector to control an oscillator, preferably of the negative transconductance type, tuned to the same frequency as the timing oscillator or to some harmonic of the timing oscillator. The output of the timing oscillator and that from the controlled oscillator are fed to some form of phase meter which may be calibrated in feet, as the phase difference is due to the time necessary for the transmitter pulse to reach a reflecting mass and return, together with any delay in the circuits. Any delay introduced in the circuits will be constant and may be taken care of in the calibration so that the meter will read the true height or distance to the reflecting mass.

This invention may be fully understood from the following description when read in connection with the accompanying drawings in which similar symbols are used to represent similar parts.

Figures 1, 2:
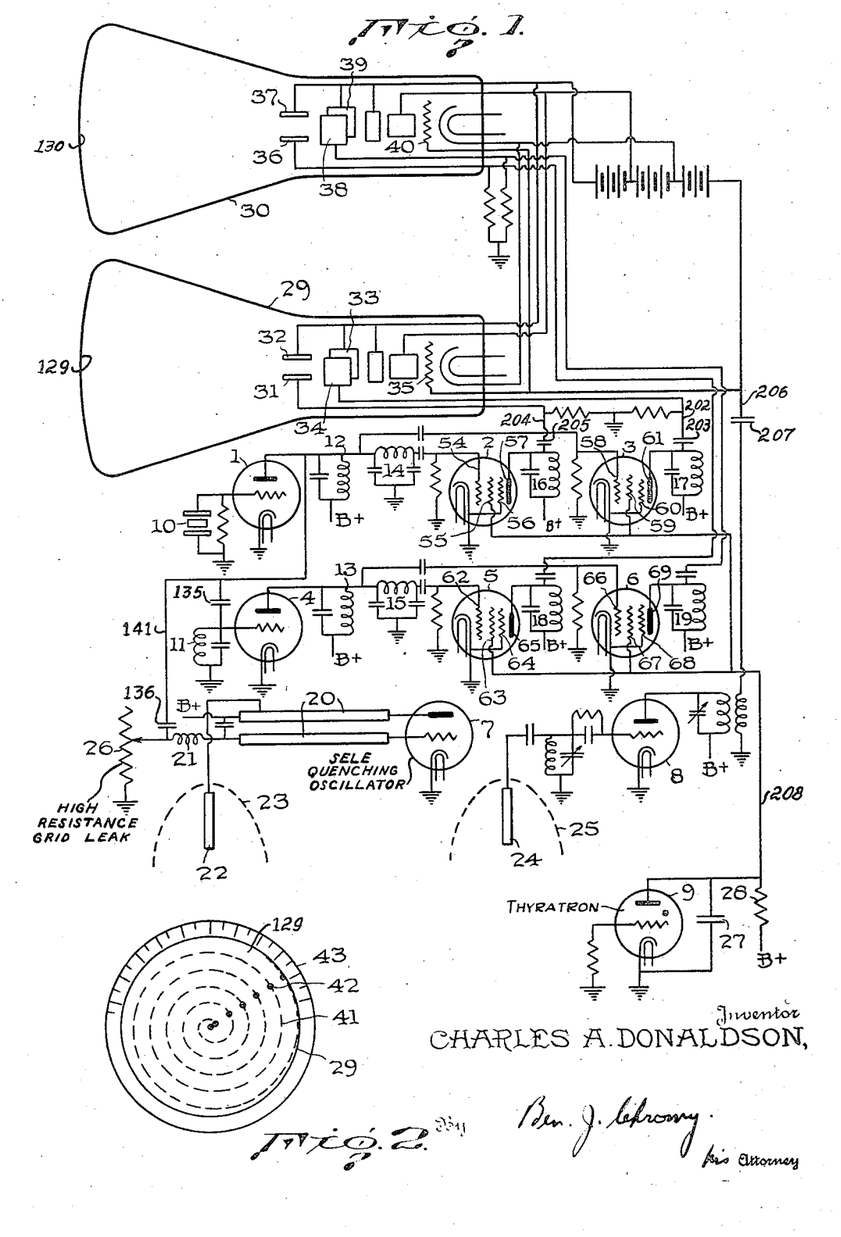
Fig. 1 is a schematic circuit diagram of one form of my invention in which I use short pulses of radio waves.
Fig. 2 is an end elevation showing an end view of the cathode-ray tube viewing screen.

In Fig. 1, a low-frequency oscillator 1 is controlled by a crystal 10, or other control device. The voltage from the plate load 12 of tube 1 is applied to the control grid 58 of the tube 3 direct, and through the phase shifter 14 to the control grid 54 of another tube 2 so that the voltages in the plate loads 16 and 17 of tubes 2 and 3, respectively, are out of phase by 90 degrees with respect to each other. The circuit of Fig. 1 also comprises a harmonic path section including tubes 4, 5, 6, which will be hereafter described. These two voltages which I call the quarter-phase output voltage are applied through connections 204, 205, and 202, 203, to the deflection plates 31, 32, 33 and 34 of the cathode-ray tube 29 so that the electron beam thereof will describe a circle on the screen 129. Tube 9 is a gas-filled triode or "thyratron" whose plate circuit is connected through connection 208 to screen grids 55, 59, 63 and 67 of tubes 2, 3, 5 and 6, respectively. In operation the grid in tube 9 blocks the flow of current through the tube while condenser 27 charges through resistor 28 up to a point at which the grid loses control. Then tube 9 breaks down and condenser 27 discharges through the plate-cathode circuit of said tube. The resistor 28 causes the plate voltage to drop low enough for the grid of tube 9 to regain control and then condenser 27 recharges through resistor 28, so that the process is repeated.

Since the voltage across condenser 27 is also the voltage applied to the screen grids 55, 59, and 63 and 67, the quarter-phase output voltages derived from tubes 2 and 3 and tubes 5 and 6 vary with it, and the size of the circles on the cathode-ray tube screens varies from zero to maximum as shown by the broken line curve 41 in Fig. 2. Of course this variable voltage may be applied to tubes 2, 3, 5 and 6 in other ways to control the output voltage, but the circuit shown and described above is one of the simple circuits. The cathode-ray tube 29 and an auxiliary cathode-ray tube 30 are shown as standard tubes with electrostatic deflection, but it will be understood that magnetic deflection types may be substituted in all cases.

Further referring to Fig. 1, the output from tube 1 is also applied through connecting means 135 to the grid of auxiliary oscillator tube 4, the input circuit 11 and/or output circuit 13 of which are tuned to a harmonic, such as the 10th, and which drives tubes 5 and 6 in the same manner that tube 1 drives tubes 2 and 3, so that the output from tubes 5 and 6 is a quarter-phase voltage at the harmonic frequency. This quarter-phase voltage is applied to the auxiliary cathode-ray tube 30 causing the electron beam to describe a spiral on the screen 130 as described above for tube 29. If tube 4 is tuned to the 10th harmonic of crystal 10, the electron beam in tube 30 will make 10 revolutions while the beam in tube 29 makes one. Thus, if the crystal 10 oscillates at 48.6 kilocycles, tube 29 will give a reading of 10,000 feet and tube 30 will give a reading of 1,000 feet. If a signal is reflected by a mass 5,500 feet away, tube 29 will give a reading of 5,000 feet plus and tube 30 will give a reading of 500 feet. This allows a much closer reading to be made than could be made from one tube at the fundamental frequency. It will be understood that one cathode-ray tube may be used to give both readings by first connecting the deflection plates to the fundamental quarter-phase voltage and then to the harmonic quarter-phase voltage by a double-pole double-throw switch.

Figure 6A:
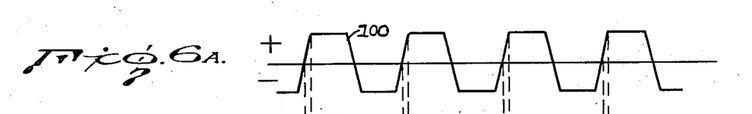
Figs. 6A, 6B and 6C show oscillograms representing the timing, grid, and output wave forms, respectively.
Figure 6B:
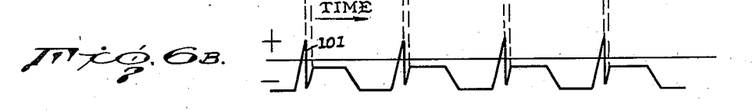
Figure 6C:
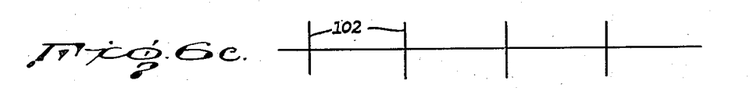

In the circuit of Fig. 1, tube 7 is an ultra-high-frequency oscillator transmitter controlled by the line 20 or other type of ultra-high-frequency control circuit. This oscillator is operated with such a high resistance grid leak 26 that it blocks after a few oscillations. Such an oscillator is often called a self-quenching oscillator. The timing voltage wave may be the sine wave from tube 1, or it may be a square wave or trapezoidal wave as shown in Fig. 6A fed through connection 141, 136, or any steep front pulse derived from the timing wave from tube 1. The trapezoidal timing wave 100 illustrated in Fig. 6A is developed from the output of oscillator 1 by any conventional means, or the oscillator 1 may itself be suitably biased to produce a substantially trapezoidal output wave form. The wave 101 developed across the grid leak 26 is illustrated in Fig. 6B in time relation with the wave 100 of Fig. 6A. As the voltage 100 becomes a few volts positive the transmitter tube 7 breaks into oscillation causing grid current to flow through grid leak 26. This rapidly drives the grid voltage of transmitter tube 7 past the cut-off point so that oscillation of transmitter tube 7 is blocked or quenched after a few cycles, and the grid stays negative during the negative portion of the cycle of wave 100 until the next positive pulse of the wave 100, when the operation is repeated producing another sharp impulse of the wave 101. The short pulse of high-frequency waves sent out by the transmitting antenna 22 and the associated reflector 23 is illustrated by one of the vertical lines 102 (Fig. 6C). Each of these lines 102 represents a short pulse consisting of several cycles of ultra-high-frequency oscillations. Upon being reflected from the earth or other reflecting mass this pulse is picked up by antenna 24 (Fig. 1) and the reflector 25 and fed to the detector 8.

In the reception of the reflected pulse, in the circuit of Fig. 1, the output of detector 8 is applied to grid 35 of cathode-ray tube 29 and grid 40 of auxiliary cathode-ray tube 30, overcoming the high negative bias and causing a bright spot to appear on the electron beam trace for the duration of the signal or pulse. Since the trace on the cathode-ray tube screen is rapidly executing a spiral path as shown in Fig. 2, the spots 42 of the individual signals register radially and cause a radial line to be traced on the cathode-ray tube screens.

As shown in Fig. 2, the electron beam trace 41 is shown as a spiral with the signal dots 42 appearing at the same angular displacement for each revolution of the beam to produce a pointer in the form of a radial pointer pointing to a reading on the calibrated scale 43. Only one pointer or signal 42, consisting of a series of dots disposed in a given radial line, is shown in the drawing, but if signals are being received from several reflectors, each signal will trace a separate line. Furthermore if the reflecting object is moving toward or away from the apparatus here disclosed, the series of dots 42 will not be disposed as a straight radial line but will be slightly curved depending on which way the reflecting object is moving.

Where desired the screen of the cathode-ray tube may be made up of small radial sections each of fluorescent material having different color characteristics. For example, beginning at the top of the screen at the zero reading on the scale 43, the screen may consist of a triangular section, having its apex at the center of the screen, of one kind of fluorescent material, and next to this section may be a similar triangular section of another kind of material and so on around the screen to facilitate reading the distance from the signal indications.

In the circuit of Fig. 1, detector 8 is shown as a simple grid leak detector, but it will be understood that other types of detectors either alone or associated with amplifiers may be used to pick up the reflected wave so long as the signal is applied to the grids of the cathode-ray tube or tubes as a sharp positive pulse or pulses. The grid of the harmonic driven cathode-ray tube will only receive a pulse every 10th revolution, in the case of the 10th harmonic, but since the fundamental frequency is so high, the eye will not be able to detect any spaces on the screen of the tube 30.

Figure 3:
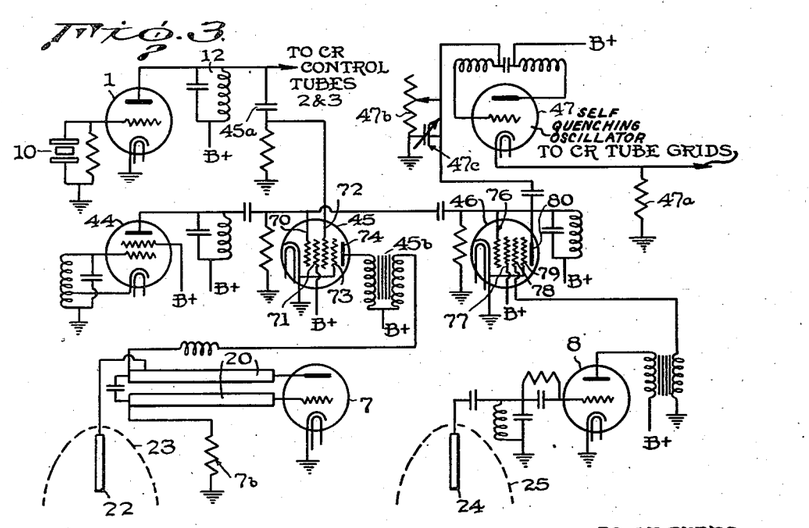
Fig. 3 is a fragmentary circuit diagram showing a modification in which an audio modulated wave is radiated, and a beat-frequency oscillator is used.

Fig. 3 shows a modification of this invention in which I radiate a radio wave modulated not more than 100%, and employ an auxiliary controlled oscillator tube to produce a beat frequency for modulation. In this figure similar numbers are used to indicate parts shown and described in Fig. 1, including tubes 2 and 3 and phase shifter 14 and thyratron 9. The output of principal timing oscillator 1 is used to drive the tubes 2 and 3 controlling the cathode-ray tubes as in Fig. 1. The output of this oscillator is also connected to grid 72 of mixer tube 45 through a coupling condenser 45a. Auxiliary beat frequency oscillator tube 44 is tuned to oscillate at some frequency higher or lower than principal timing oscillator tube 1 by a small amount and the output is connected to grid 70 of mixer tube 45. Since the plate load of mixer tube 45 is an audio transformer or choke 45b, the output will be an audio beat note which is the difference between the frequencies of oscillators 1 and 44. This frequency is used to modulate the output of transmitter tube 7 since the plate current of transmitter tube 7 passes through one winding of the transformer 45b. The output of ultra-high-frequency transmitter oscillator 7 is radiated from the shielded directive transmitting antenna 22.

Figure 7:
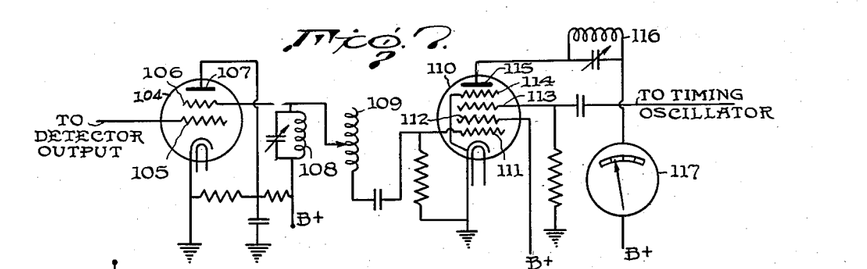
Fig. 7 shows a fragmentary circuit diagram representing a further modification in which a phase meter is used as the indicator instead of the cathode-ray tube.

The reflected ultra-high-frequency wave is picked up by receiving antenna 24 and detected by detector tube 8, and the audio-frequency output of this detector is fed to grid 78 of receiving mixer tube 46 which is also provided with a grid 76 connected to the output of the auxiliary beat frequency oscillator tube 44, so that a beat note is produced in the plate circuit of receiving mixer tube 46 equal to the timing frequency of principal timing oscillator tube 1. The phase of the beat frequency output of receiving mixer tube 46 however, will be shifted with respect to the oscillations produced by the principal timing oscillator 1, by the time necessary for the transmission and return of the radio wave. The wave from plate 80 of receiving mixer tube 46 is used to control tube 47 which may be a blocking oscillator producing a short wave train, or self-quenching oscillator, to give a sharp positive pulse that is applied to the cathode-ray tube grids or to the phase meter type of indicator 117 as shown in Fig. 7. Since auxiliary beat-frequency oscillator 44 (Fig. 3) is used in transmission in producing the audio frequency and also in reception to beat with it to derive the original timing frequency, it is not necessary for auxiliary beat frequency oscillator tube 44 to be tuned to any particular frequency so long as the beat note falls in the range of the audio frequencies. This will be best understood by tracing the frequencies through the circuits of Fig. 3. If it is assumed that the output of the principal timing oscillator tube 1 is a frequency F' and the output of the auxiliary beat-frequency oscillator 44 is F'' then the output of the mixer tube 45 will have both frequencies F' and F'' and also frequencies F' plus F'' and F'−F''.

With further reference to Fig. 3, the plate load of transmitting mixer tube 45 offers a high impedance to the frequency F' minus F'' so that the output is an audio tone of the difference of these frequencies and this tone is used to modulate transmitter tube 7. The reflected wave is detected by detector tube 8 producing the F'−F'' tone. This difference frequency is applied to receiving mixer tube 46 (Fig. 3) and F'' is also applied to this tube from beat-frequency oscillator 44 by way of the grid 76 so that in the combined term F'−F''+F'', the F'' terms cancel out and the result is the F' frequency, with the phase shifted by the time necessary for the radio wave to reach the earth or other body and be reflected. Of course it is desirable that the plate load of receiving mixer tube 46 be tuned to the F' frequency although other tuned circuits may also be connected thereto. This F' frequency is used to control the blocking or self-quenching oscillator 47. The action of the blocking oscillator tube 47 producing a short wave train, or self-quenching oscillator, is similar to that described in connection with the UHF oscillator 7 in Fig. 1. With tube 47, however, the useful output is not the oscillation itself, but the sharp voltage pulse built up across the cathode resistor 47a by the plate current flowing during the oscillation. This pulse could be taken from the plate or from the grid, but I have found that I can get a sharp positive pulse across the cathode resistor without causing any unbalance between the plate and grid, while a connection to either the plate or grid may cause trouble in the self-quenching oscillator. I use a high-frequency oscillator tank circuit so that the grid voltage will build up to the cutoff value in a small fraction of a micro-second. This is of course adjusted by adjusting the value of the variable resistor 47b and condenser 47c and/or the ratio between the impedances of these elements 47b and 47c.

If the indicator shown in Fig. 7 is used with the instrument of Fig. 3, self-quenching oscillator tube 47 is not required, since the output from receiving mixer tube 46 is applied to the phase meter direct.

Figures 4, 5:
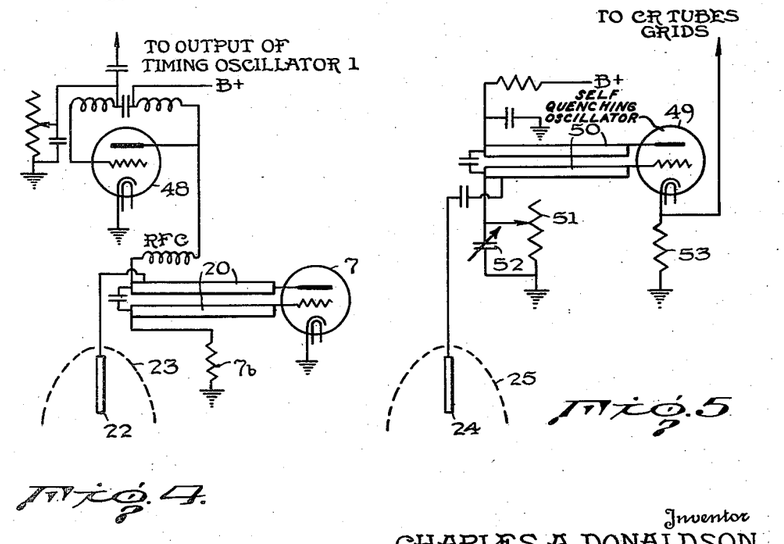
Fig. 4 is a fragmentary circuit diagram showing another modification in which timing pulses are added to a continuous carrier wave, employing a separate blocking oscillator at the transmitter.
Fig. 5 is a fragmentary circuit diagram showing a specially adapted pulse detector.

A modification of this invention in which I use a constant radio carrier wave with short pulses added at the timing frequency is illustrated in a form of transmitting circuit shown in Fig. 4. This pulse may be positive or negative so long as the final pulse applied to the grids of the cathode-ray tubes or to the grid of the auxiliary oscillator is positive. The blocking oscillator 48 is controlled by the principal timing oscillator 1 so that it adds a sharp pulse to the output of the high-frequency oscillator 7 at a certain point in the timing cycle. In this case I show the pulse taken from the plate tank, but it will be realized that it may be taken from the cathode as described for tube 47. The wave from oscillator 7 is sent out from antenna 22 with its reflector 23. The return wave is picked up by an antenna 24 as in Fig. 1, and reflector 25, detected by the detector 8 (Fig. 1) and the pulse is applied to the cathode-ray tube grids as shown in Fig. 1 or to the auxiliary oscillator grid 105 as shown in Fig. 7. The radio output transmitter tube 7 in both Fig. 3 and Fig. 4 is not a blocking oscillator, but employs a small enough grid leak 7b to oscillate continuously and is modulated in the usual manner.

Another kind of pulse detector which may be used to detect the short pulses sent out by a blocking oscillator, such as that shown in Fig. 1, is illustrated in Fig. 5. The reflected pulses of high-frequency waves are picked up by the antenna 24 with reflector 25 and applied to the plate-grid circuit 50 of the blocking oscillator producing a short wave train, or self-quenching oscillator 49. The tuned line 50 is adjusted to substantially the same frequency as the sending oscillator 7. The blocking period is controlled by the grid resistor 51 and condenser 52 circuit and is set close to the period of the sending oscillator 7. When a series of pulses is picked up, the blocking or self-quenching oscillator 49 locks in step with the transmitter. Since the plate current flows only during the oscillation, the pulse across the cathode resistor 53 is very sharp and may be applied to the grids of the cathode-ray tubes as shown in Fig. 1 or to the auxiliary oscillator grid 105 as shown in Fig. 7.

Fig. 5 shows the tuned line 50 as the frequency control, but it will be realized that any type of high-frequency control circuit may be used. The usual types of detectors are very insensitive to the short pulses sent out by a blocking or self-quenching oscillator as the pulse does not last long enough for a resonant current to be built up in the detector output circuit. In this type shown in Fig. 5, however it is only necessary for the pulse to last long enough to build up a resonant current in the high-frequency input circuit. It also has an inherent AVC action as the signal has nothing to do with the amplitude of the output pulse, but only with its relation to the timing cycle.

Fig. 7 shows a phase meter type of indicator in which the pulse of substantially constant amplitude from the detector corresponding to detector 8 of Fig. 1 is applied to grid 105 of reactance oscillator tube 104. This tube is shown as a negative transconductance type of oscillator with the plate load 108 in the screen grid circuit and with the plate voltage lower than the screen grid voltage. The plate load 108 is tuned to the timing frequency corresponding to the frequency of principal timing oscillator 1 of Fig. 1, so that reactance tube 104 will oscillate at the timing frequency. When the pulses from the detector are fed to the control grid 105 the tube locks in step with the timing oscillator, but the phase is determined by the reflected received pulses and is retarded by the time necessary for the wave to be sent out from the transmitter, reflected and returned. In Fig. 7 I show the output applied to the phase shifter 109 and thence to grid 111 of mixer tube 110. The wave from the timing oscillator 1 is applied to grid 113. The output is taken from plate 115 to plate load 116. Since the plate current depends on the voltages on both grids 111 and 113, the plate current and reading of the meter 117 which is of the milliammeter type, will vary as the phase shifts from zero to 180 degrees and the meter may be calibrated in feet.

The arrangement shown in Fig. 7 measures the difference in phase between the oscillations produced by principal timing oscillator 1 (Fig. 1) and applied to grid 113, and the received oscillations applied through the detector and the reactance tube 104 to the grid 111 of mixer tube 110. It will be understood that other types of phase meters may be used, such as a rectifier rectifying the A. C. component from the plate load 116 and using a milliampere meter for the indicator, or a dynamometer type instrument may be used with one set of coils connected to plate load 108 and the other connected to timing oscillator 1. I show a phase shifter 109 in the circuit so that the most sensitive operating point of the phase meter circuit characteristic may be brought to the zero region on the scale since this characteristic is not linear. Thus the instrument will give larger deflections for small phase differences or smaller distances and will be most sensitive on landings and takeoffs.

Figure 9:
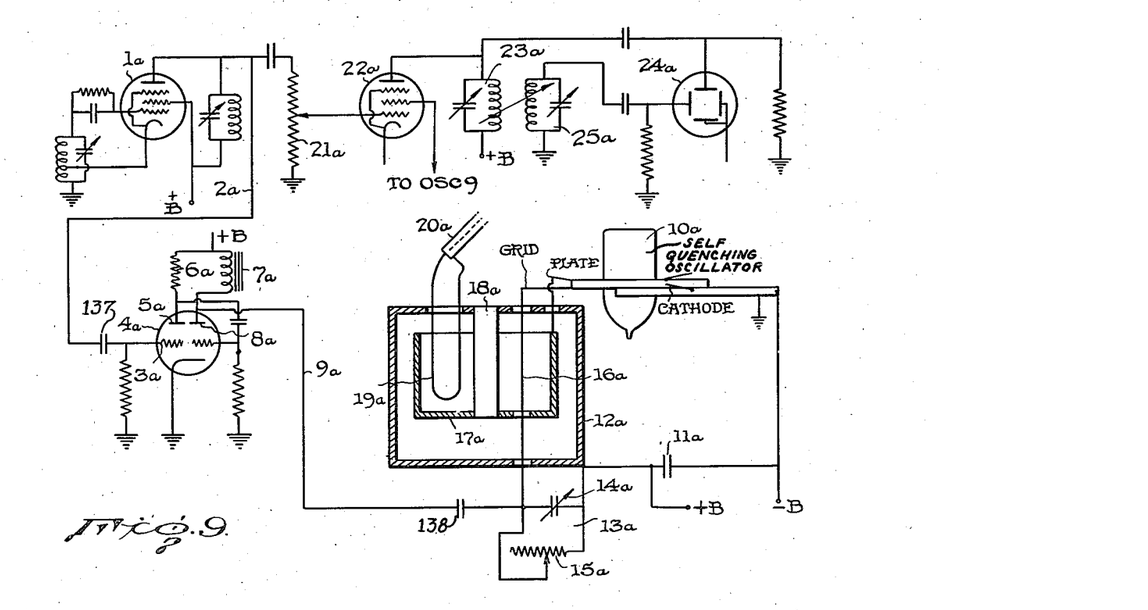
Fig. 9 is an illustration of the circuit of another form of oscillator employed in accordance with this invention, showing a complete apparatus as employed in practice.
Figure 16:
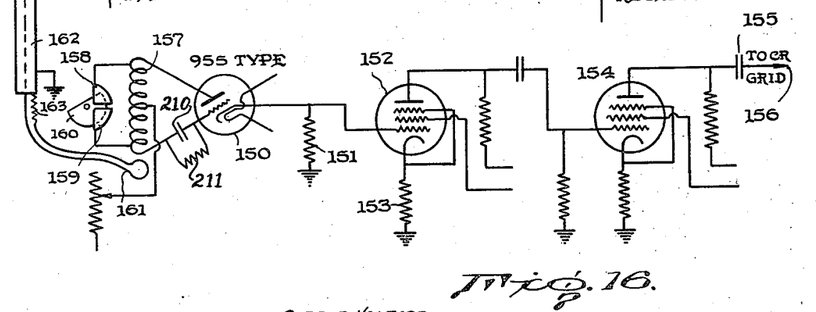
Fig. 16 is a schematic circuit diagram of a still further modified form of receiving circuit as used in practice.

The circuits illustrated in Figs. 9 and 16 show connections of the apparatus as actually constructed and used. One of the features of the transmitter shown in Fig. 9 is that I use the ultra-high-frequency output of the grid-plate tank, the tank circuit being heavily loaded by the antenna. In the case of the receiver I use the pulse output, but instead of a control pulse of several volts I use the pulse of ultra-high-frequency waves picked up by the receiving antenna. By using a grid-plate tank tuned to the ultra-high-frequency of the timing pulse, however, I have been able to lock the receiver in step with the transmitter by the reflected wave to a height of 1500 feet using a 955 acorn tube as the transmitter shown in Fig. 9. A receiver such as illustrated in Fig. 16 was employed with this acorn tube transmitter.

The transmitter shown in Fig. 9 consists of a timing oscillator 1a of the self-excited type employing a 6SJ7 type pentode tube in which the cathode and first and second grids function as the oscillation generator, and the plate is connected by means of the wire 2a and a coupling condenser 127 to the grid of a clipping and amplifying tube to develop a square wave, or to the grid 3a of the multi-vibrator or relaxation oscillator tube 4a of the 6SC7 type. The plate 5a of the tube 4a is connected to the positive terminal of a current supply through a resistance 6a of approximately 100,000 ohms, and the plate 8a of the other triode section of the tube 4a is connected to the said positive terminal through a choke coil 7a of about 85 millihenries inductance. This plate 8a is also connected by means of the wire 9a and coupling condenser 138 to the blocking circuit 13a and grid of the tube 10a which is an acorn or 955 type. The blocking or quenching circuit 13a consists of a small variable condenser 14a variable from 3 to 30 micro-microfarads capacity, and a variable resistance 15a of approximately 5 megohms. This blocking circuit sets the blocking or quenching period of the oscillator tube 10a at a frequency close to the timing frequency of the oscillator 1—a which corresponds to the oscillator 1 of Fig. 1. The cathode of the triode 10a is connected through the condenser 11a to the pot 12a which may be of copper, aluminum or the like and is approximately 2 inches in diameter. The wire 16a extends through the pot 12a as illustrated and also extends through the inner or plate member 17a which is supported on a rod 18a axially disposed in the member 12a. This unit including the pot 12a, the inner member 17a and the rod 18a forms the tuned tank for the ultra-high-frequency oscillator 10a, and suitable coupling between the grid and plate of this tube is provided by the line 16a passing through said tank, the member 17a of which is connected to the plate of said tube. The coaxial line 20a feeding the antenna is coupled to the tank by means of the loop 19a.

Figure 10:
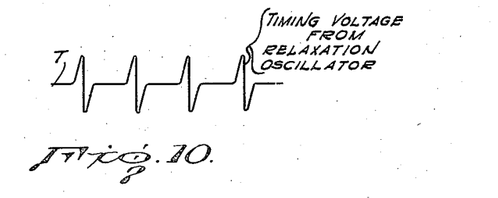
Fig. 10 illustrates the wave form of the timing voltage applied to the grid circuit of the ultra-high-frequency oscillator tube shown in Fig. 9.
Figure 11:
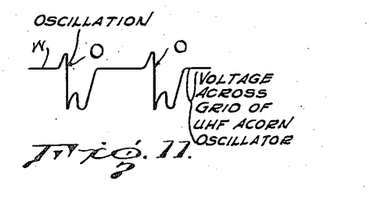
Fig. 11 illustrates the wave form of the voltage across the grid of this same oscillator tube.

In Fig. 10 is illustrated the wave form T of the timing voltage output of the oscillator fed over the line 9a to the blocking or self-quenching circuit 13a. In Fig. 11 is shown the wave form W of the voltage across the grid of the oscillator tube 10a. Oscillations are produced by the tube 10a as the voltage of the tube 10a passes through the portion of the wave designated by the straight line O.

Figure 12:
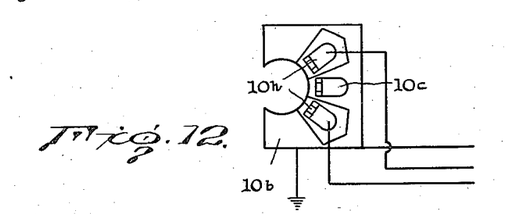
Fig. 12 shows the mounting and the socket connections on the cathode side of the ultra-high-frequency oscillator tube shown in Fig. 9.

In Fig. 12 is illustrated the support for the tube 10a. This support includes a metal plate 10b to which is attached the cathode contact 10c whereby the cathode of the tube 10b is connected directly to the metal plate 10b. The cathode heater contacts 10—b are supported by mica insulators on the plate 10b.

Referring further to Fig. 9, part of the output of the oscillator 1—a is applied through a coupling condenser to the potentiometer 21a, the variable contact of which is connected to the control grid electrode of the tube 22a which is of the 6SK7 type. A tuned circuit 23a is connected to the anode of the tube 22a and also to one of the deflector plates of the cathode-ray tube 24a, which circuit is tuned to the timing frequency of the timing oscillator 1—a, as is also the tuned circuit 25a which is coupled in a variable manner to the inductance coil of the tuned circuit 23a. These tuned circuits are employed for producing the 90 degree phase-displaced voltage used for rotating the cathode-ray tube beam, and for this purpose these tuned circuits are connected to the deflector electrodes of the cathode-ray tube 24a as shown. If it is desired to vary the trace of the cathode-ray tube beam to follow a spiral path as shown in Fig. 2, the screen grid electrode of the tube 22a may be connected to the gas discharge oscillator 9 as shown in Fig. 1. Furthermore the coupling between the inductances of circuits 23a and 25a may be varied to produce a symmetrical trace on the cathode-ray-tube screen.

The prototype of the detector shown in Fig. 16 is the supperregenerative detector, but in the superregenerative detector the length of the individual pulses of oscillation are controlled by the modulation on the incoming wave and the plate current reproduces this modulation. In this present receiver there is no modulation, only a series of pulses, and therefore when no signal is being received the detector will produce pulses at some frequency or period depending on the circuit constants. When a pulse wave is picked up, however, the detector frequency will tend to lock in step with the received pulses, and if the detector period is set close to the period of the received pulses it will be a very sensitive detector. The amplitude of the pulses from the detector has nothing to do with the amplitude of the received pulses, but depends on the circuit constants, so that this detector may be said to have 100 percent AVC action.

In the ordinary superregenerative circuit the quench frequency is set to some super-audio-frequency without much regard to what it is. In my circuit it is necessary to be able to vary the quench or blocking frequency in order to bring the detector in step with the transmitter. This may be done by varying the grid resistor, the grid condenser, or the plate voltage. The sensitivity of the detector with the blocking frequency set to the transmitter pulse rate, may not be as high as it would be with the optimum quench frequency, but it is still very high. For instance, th a regular grid lead detector using a 954 tube was possible to pick up my transmitter about block away while with the pulse detector it is ssible to pick up the reflections from objects lf a mile or more away using the same transitter. This may be because of the fact that the lses from the transmitter are so short that cillations do not have time to build up in the ned circuits of the ordinary detector before the lse stops. In my pulse detector the first few HF oscillations of the pulse immediately start local oscillation which build up to the maxium determined by the circuit constants. This sults in detection of a pulse lasting only a fracn of a micro-second.

Figure 17:
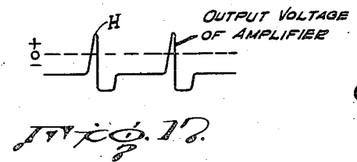
Fig. 17 is a diagram showing the wave form of the output amplifier tube shown in Fig. 16.

In a physical embodiment of the receiver I use acorn tube 150 (Fig. 16) in a superregenerave circuit with the addition of a 200 ohm cathe resistor 151. The grid of an 1852 type tube 2 is directly connected to the cathode of tube 0. The 1852 tube is biased to cut off with a ,000 ohm cathode resistor 153 so that no plate rrent flows in it except during the pulse of rrent across the 200 ohm cathode resistor 151 the tube 150. This pulse is amplified in a secd 1852 type tube 154 giving a sharp pulse in e positive direction as shown at H in Fig. 17, ich is applied to the grid of the cathode-ray be through the coupling condenser 155 and line 6.

The coil 157 consists of two turns $\frac{7}{16}$" in diamer and is connected to a midget condenser, arnged so that one stator plate 159 is connected one end of the coil 157 and the other stator ate 158 is connected to the other end while the tor plate 160 is between said stators for tuning. ith this small capacity I am able to tune out the lses when the transmitting antenna is directed ward the receiver and only a few feet away. ith the receiver tuned to the same frequency, owever, it will lock in step with the reflected aves.

Figure 13:
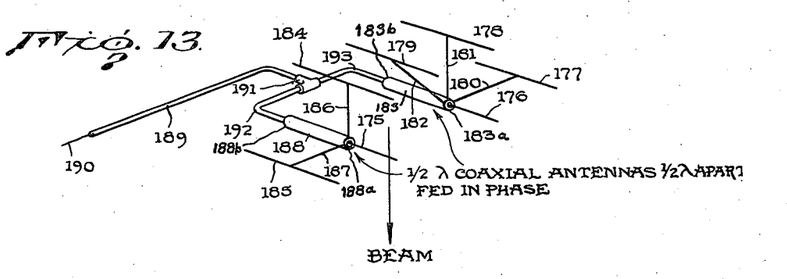
Fig. 13 illustrates a perspective view of a form of directional transmission antenna that may be employed in accordance with this invention.

In Fig. 13 is shown a perspective view of a form directional transmitting antenna employing a ir of one-half wave-length elements 175 and 16 spaced one-half wavelength apart. Reflecrs 177, 178 and 179 are supported by wires or ds 180, 181 and 182, respectively, upon the outde tube 183 substantially at the midpoint of the axial antenna 176 so as to be fed by radioequency energy in the proper phase to cause ansmission in the direction indicated by the eam." Additional reflectors 184 and 185 are pported by the rods 186 and 187, respectively, copper or the like, on the coaxial antenna tube 8. The reflectors 184 and 185 cooperate with e reflectors 177, 178 and 179 to beam the energy om both of the antennas 175 and 176. The proortions of the antennas extending out of the bular members 183 and 188 are connected to e coaxial conductor 190 of the coaxial cable 9, said conductor 190 being insulated from the ter sheath conductor of said cable by means ell known in the art. The sheath of the cable 9 is coupled to the L-shaped members 192 and 3 by a T-coupling 191. These L-shaped memers are connected to the antenna tubes 183 and 8 while the wire 190 extends through the coxial cable, the cable couplings etc. and is conected to the antenna elements 175 and 176.

The reflectors 177, 178, 179, 194 and 195 are bout 5% longer than one-half wavelength, alough they may be still longer without sacricing their efficiency as reflectors to too great a egree, however they can not be much shorter if they are to act as reflectors. The length of the reflector supports 180, 181, 182, 186 and 187 are determined by experiment and depend upon the sharpness of the beam desired. In order to obtain a beam as sharp as possible, the supports 180 and 187 are made approximately one-quarter wave length long, the supports 181 and 186 approximately one-eighth wavelength long, and the support 182 is made of such length as to position the reflector 179 about three-eighths wavelength above the antennas 183 and 188 and half way between them. These reflector supports are of metal although they may be of insulating material.

The portions 175 and 176 of the coaxial antennas extending out of the tubes 183 and 188 are about 5% less in length than one-quarter wave length and likewise the half wave antennas 194 and 195 are about 5% less in length than one-half wavelength.

The sleeves 183 and 188 are of metallic material and are connected to the coaxial sheaths 193 and 192, respectively at the ends 183a and 188a. These sleeves produce a high impedance across the open ends 183b and 188b thereof, and this reduces the possiblity of radiation from the outer line so that the total radiation is from the antenna quarter wave sections 175 and 176.

Figure 14:
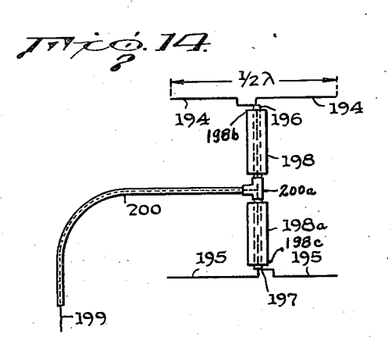
Figs. 14 and 15 show diagrammatically in elevation and plan a form of receiving antenna that may be employed to obtain balanced pick-up and decrease to a minimum direct pick-up from the transmitting antenna.
Figure 15:
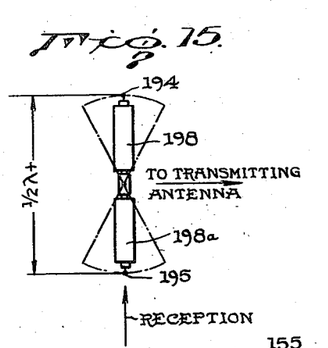

A form of receiving antenna is illustrated in Figs. 14 and 15 consisting of two half-wavelength di-poles 194 and 195 spaced one-half wavelength apart and connected to the coaxial cable 200 in opposite phase, one of the sections of each di-pole being connected to the inner conductor 199 of the cable and the other sections of the di-poles being connected to the cable sheath. A pair of tubular conductors 198 and 198a are provided around the coaxial cables adjacent to the di-poles for the purpose of blocking signal pick-ups on these portions of the cables. These sections 198 and 198a are about 5% less than one-quarter wavelength long and are connected to the cable sheath 200 adjacent to the T-connector 200a. Employing these sections 198 and 198a has the effect of connecting a high impedance at the open ends 198b and 198c thereof adjacent the di-poles 194 and 195. As a result these antennas are more easily matched to the line and balanced for directional reception. This increases the directivity of the di-pole receiving antenna and permits reception from a very limited angle as illustrated in dotted outline in Fig. 15. The antenna is rotatable around the axis thereof to obtain reception from a variety of directions, keeping the direction of the transmitter out of the angle of reception.

Figure 8:
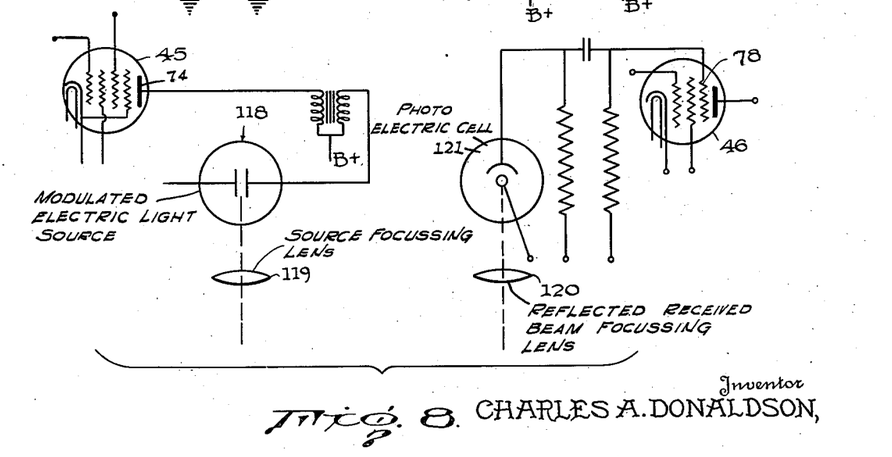
Fig. 8 shows a modification of the circuit of Fig. 3 in which a modulated light beam is used instead of the modulated radio wave.

Fig. 8 shows a modification of the circuit shown in Fig. 3 in which I use a search light beam as the measuring device instead of a beam of radio waves. In this instrument the output from plate 74 of tube 45 is applied to a light source 118, modulating the light beam at an audio frequency. The beam is focussed by the lens 119 and thrown on some reflecting object. The reflected beam is picked up by lens 120 and focussed on photo tube 121. The output of the tube 121 is applied to grid 78 of tube 46 where it beats with the output from tube 44 to generate the timing voltage which is out of phase with the original timing voltage by the time necessary for the light beam to reach the reflector and return. This is measured as described above in the description of Fig. 3.

While I have set forth a detailed description of an embodiment of my invention I do not desire to be limited to the exact details set forth except insofar as those details are defined by the claims.

What I claim is as follows:

1. Radio apparatus, comprising: a cathode-ray tube having horizontal and vertical ray deflection means, a control grid and a fluorescent screen, a sweep frequency oscillator, means for deriving quarter-phase potentials from said oscillator, connections for applying said potentials, respectively, to said ray deflection means, means for causing said potentials to simultaneously and recurrently vary from zero to maximum whereby the cathode ray traces a recurrent spiral on the fluorescent screen, a high-frequency transmitting oscillator of the self-quenching type, connections whereby said sweep frequency oscillator periodically and recurrently unblocks said high-frequency oscillator to permit the generation and radiation of high-frequency pulses having a definite time relation to the quarter-phase ray deflecting potentials, means for picking up said pulses reflected from an object spaced apart from the transmitting oscillator, and means responsive to said picked-up pulses for momentarily increasing the intensity of the cathode ray, whereby the spiral path of said ray displays a plurality of radially aligned bright spots, the angular displacement of the radial line of spots from a reference point on the circumference of the screen being a function of the time elapsing between each unblocking of the transmitting oscillator and the picking up of the reflected pulse.

2. Radio apparatus set forth in claim 1, additionally comprising a second cathode-ray tube connected substantially in parallel with the first mentioned cathode-ray tube, and means for causing a sweep frequency applied to said second cathode-ray tube to be an harmonic of the sweep frequency applied to the first mentioned cathode-ray tube, whereby the angular velocity of the cathode ray in said second tube is a multiple of the angular velocity of the cathode ray in said first mentioned tube.

3. Radio apparatus, comprising: a cathode-ray tube, a sweep frequency oscillator, means for deriving out-of-phase potentials from said oscillator, connections for applying said potentials to said tube for controlling the cathode ray thereof, a high-frequency transmitting oscillator of the self-quenching type, connections whereby the sweep frequency oscillator periodically and recurrently unblocks the high-frequency oscillator to permit the generation and radiation of high-frequency pulses having a definite time relation to said out-of-phase ray controlling potentials, means for picking up said pulses reflected from an object spaced apart from the transmitting oscillator, and means responsive to said picked-up pulses for momentarily increasing the intensity of the cathode ray to produce a bright spot, the angular displacement of said bright spot from a reference point on the circumference of the screen being a function of the time elapsing between the unblocking of the transmitting oscillator and the picking up of the reflected pulse.

4. Radio apparatus as set forth in claim 3, additionally comprising a second cathode-ray tube connected substantially in parallel with the first mentioned cathode-ray tube and means for causing the sweep frequency applied to said second cathode-ray tube to be an harmonic of the sweep frequency applied to said first mentioned cathode-ray tube, whereby the angular velocity of the cathode ray in the said second tube is a multiple of the angular velocity of the cathode ray in said first mentioned tube.

5. Radiant energy signaling apparatus, comprising: indicating means, a first oscillator, means for deriving potentials from said first oscillator, connections for applying said potentials to circuits of said indicating means, means for causing said potentials to simultaneously and recurrently vary from zero to maximum, a high-frequency transmitting oscillator of the self-quenching type, connections whereby said first oscillator periodically and recurrently unblocks the high-frequency oscillator to permit the generation and radiation of high-frequency pulses, means for picking up said pulses reflected from an object spaced apart from said transmitting oscillator, and means responsive to said picked-up pulses for momentarily producing an indication in said indicating means characterized by the time elapsing between the unblocking of the transmitting oscillator and the picking up of the reflected pulse.

6. In radio apparatus, a receiving antenna for receiving periodic pulses of oscillations of high frequency, a principal oscillator and an auxiliary oscillator, said oscillators having frequencies which differ by a frequency which is the frequency of said periodic pulses, a cathode-ray tube having a first set of electrodes connected to said principal oscillator, a detector connected to said receiving antenna, a mixer tube having a first control electrode connected to the output of said detector and further having a second control electrode connected to said auxiliary oscillator, and electronic means adapted to produce a sharp voltage pulse connected between the output of said mixer tube and a second electrode of said cathode-ray tube.

7. Radio apparatus according to claim 6, said electronic means being a self-quenching oscillator tube having a high-resistance grid leak and delivering a sharp pulse from one of its electrodes which is connected to said second electrode of said cathode-ray tube.

8. In radio apparatus, a transmitting antenna and a receiving antenna, a transmitting high-frequency generating tube having its output connected to said transmitting antenna, a principal oscillator and an auxiliary oscillator, said oscillators having frequencies which differ by an audio frequency, a transmitter mixer tube unit having input connections respectively from said oscillators and being adapted to deliver an output frequency which is the difference between the frequencies of said oscillators and having its output connected for modulating the output of said transmitting tube, a cathode-ray tube having a first set of electrodes connected to said principal oscillator, a detector tube connected to said receiving antenna, a receiver mixer tube having a first control electrode connected to the output of said detector tube and further having a second control electrode connected to said auxiliary oscillator, and electronic means adapted to produce a sharp voltage pulse connected between the output of said receiver mixer tube and a second electrode of said cathode-ray tube.

9. In radio apparatus, a receiving antenna for receiving periodic pulses of oscillations of high frequency, a timing oscillator of the period of said pulses, a second oscillator unit comprising a multi-grid tube and a tuned output circuit connected to a first grid of said tube and being tuned to the frequency of said timing oscillator and further comprising means for supplying anode voltage to said first grid of said multi-grid tube and means for supplying to the plate of said multi-grid tube anode voltage of less value than is supplied to said first grid thereof, a detector tube having its input connected to said antenna and its output connected to the second grid of said multi-grid tube, a mixing tube having a plurality of grids and having a first one of its said grids connected to said timing oscillator and having a second one of its said grids connected to said first grid of said multi-grid tube, and a phase meter connected to the anode of said mixer tube and being adapted to indicate the phase of the resultant output of said mixer tube.

10. Radio apparatus according to claim 9, and phase adjusting means inserted in the connection between said second grid of said mixer tube and said first grid of said multi-grid tube.

11. In radio apparatus, a receiving antenna for receiving periodic pulses of oscillations of determined high frequency, a principal oscillator producing oscillations of said high frequency, a cathode-ray tube having a first set of electrodes connected to said principal oscillator, a self-quenching tube oscillator, a tuned line connecting the plate-grid circuit of said self-quenching tube oscillator to said receiving antenna and being tuned to the frequency of said principal oscillator, said self-quenching tube oscillator being adjusted to have its blocking period close to the period of said principal oscillator, and an output connection between an electrode of said self-quenching tube oscillator and a second control electrode of said cathode-ray tube, whereby said self-quenching tube oscillator and its output locks in step with said receiving periodic impulses.

12. Radio apparatus according to claim 11, said output connection between said electrode of said self-quenching oscillator tube and said second control electrode of said cathode-ray tube comprising an amplifying tube having a relatively large cathode resistor and being biased for restricted cut-off whereby it delivers output only during application of output pulses from said self-quenching oscillator tube.

13. Radio apparatus according to claim 3, said transmitting oscillator of the self-quenching type comprising a high-resistance grid leak, and blocking after a few oscillations, to produce a sharp pulse.

14. Radio apparatus according to claim 6, and means for deriving quarter-phase potentials comprised in the connections between said principal oscillator and said set of electrodes of said cathode-ray tube.

CHARLES A. DONALDSON.